Nov. 22, 1955   D. M. MISIC   2,724,589
AXLE SPRING MOUNTING
Filed Feb. 28, 1952
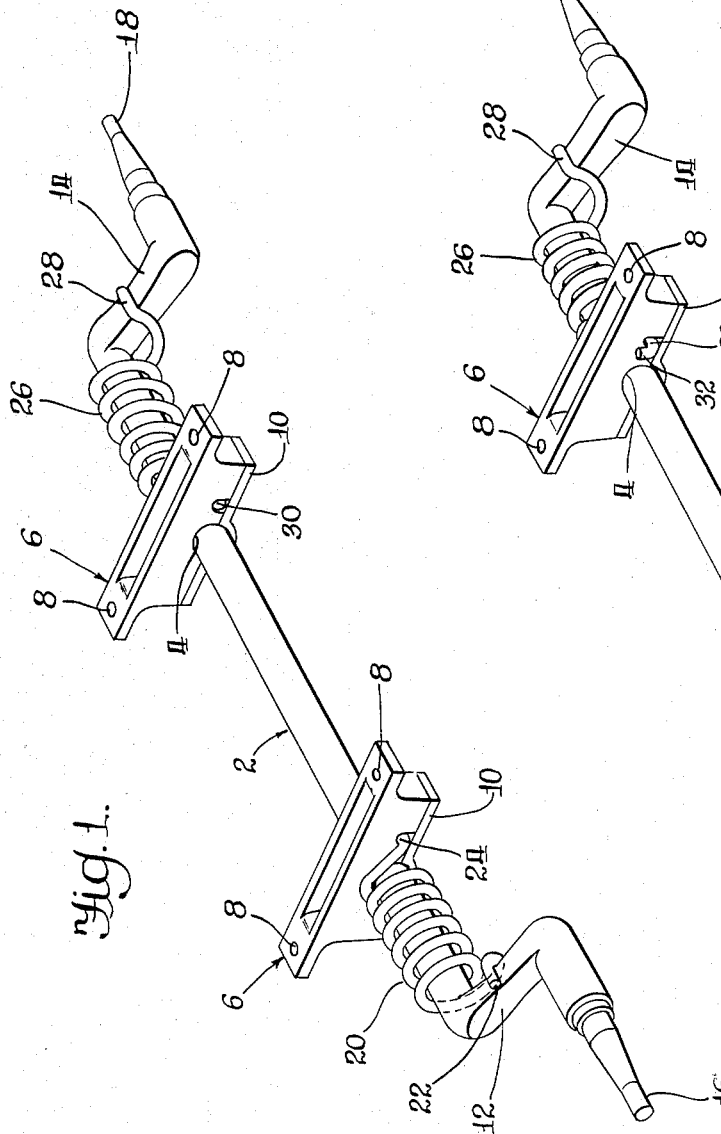
INVENTOR.
Donald M. Misic
BY Orvin O. B. Garner
Atty

United States Patent Office 2,724,589
Patented Nov. 22, 1955

2,724,589
AXLE SPRING MOUNTING

Donald M. Misic, Chicago, Ill., assignor to American Steel Foundries, Chicago, Ill., a corporation of New Jersey Application February 28, 1952, Serial No. 273,823

1 Claim. (Cl. 267—58)

This invention relates to axle assemblies and more particularly to a torsion spring axle support for a land vehicle such as a trailer.

A primary object of the invention is to devise an arrangement wherein the vehicle load is carried by helical or coil springs sleeved over an axle and anchored at their outer ends to crank arms of the axle, the inner ends of the springs being anchored to the vehicle.

A further object of the invention is to eliminate the necessity for welding or otherwise attaching spring anchor clips to the axle or parts thereof.

Still another object of the invention is to devise an axle assembly, such as above described, which comprises bearing brackets journaled on the axle to form a convenient assembly unit therewith.

The foregoing and other objects and advantages of the invention will become apparent from a consideration of the following specification and the accompanying drawings, wherein:

Figure 1 is a perspective view of an axle assembly embodying a preferred form of the invention, and Figure 2 is a fragmentary perspective view illustrating a modified form of the invention.

Describing the invention in detail and referring first to Figure 1, the novel axle assembly illustrated therein comprises an axle 2 journaled within bushed openings 4 of brackets generally designated 6, which may be integrally attached to or formed as parts of a vehicle body or may be removably attached thereto by any convenient securing means (not shown) extending through openings 8 of the bracket. The brackets 6 are provided with bearing caps 10, which retain the axle 2 in the bearing openings 4, and are removably attached to the brackets 6 in any convenient manner, as for example, by cap screws (not shown).

The ends of the axle 2 are integrally formed with or detachably keyed to crank arms 12 and 14, respectively, said crank arms being integrally formed with or detachably secured to spindles 16 and 18, respectively, which are preferably coaxial and approximately parallel to the rotational axis of the axle 2, said spindles being formed and arranged for attachment in the usual manner to wheels which support the weight of the vehicle body transmitted to the axle 2 through the brackets 6.

A right-hand coil spring 20 is sleeved over the axle 2 between the crank arm 12 and the adjacent bracket 6, the outer end of the spring 20 being formed with its end bent approximately parallel with the rotational axis of the axle 2, thereby forming a hook 22 engaged with the upper side of the crank arm 12, the inner end of the spring 20 being provided with a similar hook 24, slidably fitted within a complementary opening of the adjacent bracket 6.

A left-hand coiled spring 26 is sleeved over the axle 2 at its opposite end, the outer extremity of the spring 26 being provided with a hook 28 similar in form to the hook 22 and engaged with the upper side of the crank arm 14. The inner end of the spring 26 is provided with a hook 30 similar to the hook 24 and received within a complementary opening of the adjacent bracket 6.

In service conditions it will be understood that load of the vehicle body supported on the axle 2 by the brackets 6 is effective to cause rotation of the axle thereby stressing the springs 20 and 26 to resiliently support said load. Also irregularities in the road traversed by the wheels (not shown) cause upward rotational movement of the crank arms 12 and 14 to further stress the springs 20 and 26.

A modified form of the invention is illustrated in Figure 2, wherein parts corresponding to those of Figure 1 are identified by corresponding numerals. In the modification, only one end of the axle 2 is shown, and it will be noted that the assembly is identical with that illustrated in Figure 1, except that the inner hooked end 30 of the spring 26 is bent over as at 32, to prevent accidental disassembly of the bracket 6 and the spring 26 prior to attachment of the bracket 6 to the vehicle body, if separable therefrom. It will be understood that in the modification, the spring 20, which is not illustrated, is similarly interlocked with the related bracket 6 by a bent portion 32 on the inner end of the spring 20.

I claim:

In an axle assembly, spaced bearing brackets, a main shaft rotatably journalled in the brackets, crank arms integrally formed on the ends of the shaft extending transversely thereof and substantially spaced from adjacent brackets, wheel mounting means integrally formed on the crank arms at points remote from the main shaft, a pair of coil springs sleeved over the main shaft, each spring being interposed between one of the crank arms and related bracket, one of said springs being a right hand spring and the other of said springs being a left hand spring, anchor holes in said brackets extending horizontally and transversely of the brackets and disposed on the same side of the shaft, said holes being horizontally aligned and being parallel with the axis of the shaft, horizontal end portions formed on the inner ends of said springs, each of said inner end portions being disposed in one of the holes, a bent segment on the extremity of each of said inner portions, said bent segment extending upwardly and overlapping the inboard side of the related bracket, and outer horizontal hook portions on the springs each anchored to the related crank arm, said inner and outer end portions on both springs being positioned on the same side of said shaft.

References Cited in the file of this patent
UNITED STATES PATENTS

| | | |
|---|---|---|
| 1,218,409 | Keeler | Mar. 6, 1917 |
| 2,426,513 | Linn | Aug. 26, 1947 |
| 2,609,212 | McMurtrie | Sept. 2, 1952 |

FOREIGN PATENTS

| | | |
|---|---|---|
| 342,649 | France | July 13, 1904 |
| 521,753 | Great Britain | May 30, 1940 |
| 636,972 | Germany | Oct. 20, 1936 |